US012673373B2

(12) United States Patent
Pham et al.

(10) Patent No.: US 12,673,373 B2
(45) Date of Patent: Jul. 7, 2026

(54) GRIPPING DEVICE FOR HOLDING, CENTRING AND/OR COLLET-CLAMPING A MICROMECHANICAL OR HOROLOGICAL COMPONENT

(71) Applicant: ETA SA MANUFACTURE HORLOGÈRE SUISSE, Grenchen (CH)

(72) Inventors: Patric Pham, Utzenstorf (CH); Christophe Donzé, Pieterlen (CH)

(73) Assignee: ETA SA MANUFACTURE HORLOGÈRE SUISSE, Grenchen (CH)

( * ) Notice: Subject to any disclaimer, the term of this patent is extended or adjusted under 35 U.S.C. 154(b) by 320 days.

(21) Appl. No.: 18/452,750

(22) Filed: Aug. 21, 2023

(65) Prior Publication Data

US 2024/0165714 A1     May 23, 2024

(30) Foreign Application Priority Data

Nov. 17, 2022    (EP) ..................................... 22208082

(51) Int. Cl.
B23B 31/20          (2006.01)
B23B 31/30          (2006.01)
(Continued)

(52) U.S. Cl.
CPC .............. B23B 31/20 (2013.01); B23Q 3/067 (2013.01); B23B 31/2012 (2021.01);
(Continued)

(58) Field of Classification Search
CPC .......... B23B 2231/2075; B23B 31/202; B23B 31/307; B23B 2231/56;
(Continued)

(56) References Cited

U.S. PATENT DOCUMENTS 3,533,637 A * 10/1970 Macy ................ B23B 31/20125
                                                          279/53
3,583,714 A * 6/1971 Weltzer ............... B23B 31/2073
                                                          279/51
(Continued)

FOREIGN PATENT DOCUMENTS

DE      102012101683 A1 * 10/2012   ......... B23B 31/2073
EP         4 082 718 A1    11/2022
(Continued)

OTHER PUBLICATIONS

European Search Report for EP 22208082 dated Mar. 30, 2023.

*Primary Examiner* — Sara Addisu
(74) *Attorney, Agent, or Firm* — Sughrue Mion, PLLC

(57)          ABSTRACT
A gripping device (100) for holding, centring and/or clamping a micromechanical or horological component (200) in a chamber delimited by a collet including at least one movable jaw (2) and at least one stationary jaw (3), wherein some of the movable jaws (2) and/or stationary jaws (3) include a reference surface (20) to support a component (200) bearing frontally thereagainst, and this gripping device (100) includes both, on the one hand, stationary jaws (3) including the reference surface (20) to support the component (200) bearing thereagainst, and movable jaws (2) for centring and/or clamping the component (200).

10 Claims, 4 Drawing Sheets

(51) Int. Cl.
  *B23Q 3/06* (2006.01)
  *G04D 1/00* (2006.01)
(52) U.S. Cl.
  CPC ..... *B23B 31/307* (2013.01); *B23B 2231/2027*
  (2013.01); *B23B 2231/2075* (2013.01); *B23B*
  *2231/56* (2021.01); *B23B 2270/12* (2013.01);
  *G04D 1/0078* (2013.01); *Y10T 279/11*
  (2015.01); *Y10T 279/17341* (2015.01); *Y10T*
  *409/303752* (2015.01)
(58) Field of Classification Search
  CPC ...... B23B 31/20–31/208; B23B 2231/20–097;
  B23B 2260/042; B23B 31/2012; G04D
  1/0078; G04D 1/0085; G04D 1/00; B23Q
  3/067; Y10T 279/17341; Y10T
  279/17521; Y10T 279/11; Y10T 279/29;
  Y10T 279/17299–17376; Y10T
  279/17418–17444; Y10T
  409/303752–303808
  See application file for complete search history.

(56) References Cited

U.S. PATENT DOCUMENTS

| | | | | | |
|---|---|---|---|---|---|
| 3,595,593 | A | * | 7/1971 | Gold | B23B 31/20125 |
| | | | | | 279/57 |
| 3,815,930 | A | * | 6/1974 | Mattes | B23B 31/202 |
| | | | | | 279/46.7 |
| 7,429,049 | B2 | | 9/2008 | Kramer | |
| 7,971,883 | B2 | * | 7/2011 | Soroka | B23Q 1/0072 |
| | | | | | 279/2.04 |
| 12,554,228 | B2 | * | 2/2026 | Pham | G04D 1/06 |
| 2005/0248103 | A1 | * | 11/2005 | Kramer | B23B 31/208 |
| | | | | | 279/43 |
| 2006/0017238 | A1 | * | 1/2006 | Bergandy | B23B 31/2072 |
| | | | | | 279/51 |
| 2013/0214494 | A1 | * | 8/2013 | Kiontke | B24B 13/005 |
| | | | | | 279/46.3 |
| 2015/0021864 | A1 | * | 1/2015 | Mauch | B23B 31/2073 |
| | | | | | 279/43.1 |
| 2018/0281202 | A1 | | 10/2018 | Brudniok et al. | |
| 2021/0078082 | A1 | | 3/2021 | Maurer | |
| 2021/0107069 | A1 | * | 4/2021 | Kenner | B23B 31/208 |
| 2021/0220924 | A1 | * | 7/2021 | Motschi | B23B 31/208 |
| 2024/0165714 | A1 | * | 5/2024 | Pham | B23B 31/20 |
| 2024/0165715 | A1 | * | 5/2024 | Pham | B23Q 3/067 |
| 2024/0168441 | A1 | * | 5/2024 | Pham | B23B 31/307 |

FOREIGN PATENT DOCUMENTS

| | | | |
|---|---|---|---|
| JP | 2005-319580 A | | 11/2005 |
| JP | 2012179699 A | * | 9/2012 |
| JP | 2018-001397 A | | 1/2018 |
| JP | 2021-41528 A | | 3/2021 |
| JP | 2022-168823 A | | 11/2022 |
| KR | 10-1352868 B1 | | 1/2014 |

* cited by examiner

GRIPPING DEVICE FOR HOLDING, CENTRING AND/OR COLLET-CLAMPING A MICROMECHANICAL OR HOROLOGICAL COMPONENT

CROSS REFERENCE TO RELATED APPLICATION

This application claims priority to European Patent Application No. 22208082.2 filed Nov. 17, 2022, the entire contents of which are incorporated herein by reference.

TECHNICAL FIELD OF THE INVENTION

The invention relates to a gripping device for holding, centring and/or collet-clamping a micromechanical or horological component in a clamping chamber delimited by a collet comprising at least one movable jaw.

The invention further relates to a method for attaching such a micromechanical or horological component in the clamping chamber comprised in such a gripping device.

The invention relates to the field of micromechanics, the positioning and clamping of components during a manufacturing step, or the positioning and clamping of tools during a manufacturing step.

TECHNOLOGICAL BACKGROUND

The very precise positioning of micromechanical components, particularly horological components, in manufacturing tooling is always complicated. This need for precise positioning must be reconciled with adequate clamping, without inducing inappropriate deformation. The problem is similar when positioning and holding micro-tools used in manufacturing operations, which often requires perfect angular indexing.

Existing clamping means include many variants of Jacobs chucks, the collets whereof are resilient or articulated in order to hold the component. In particular, "Ottet" type collets are very commonly used in conventional clamping means in the horological industry. This type of clamp enables components to be clamped by opening or closing collet segments which deform resiliently, typically under the combined action, in an axial direction, of a screw-nut system, a resilient return means such as a spring, a push-piece such as a ball or the like bearing against this resilient return means, and a cone tapering inwards or outwards cooperating with sectors of conical or rounded profile which are comprised in the segments. These segments are intended to be machined, usually internally, so as to match, as much as possible, the contours of the component to be clamped, and can be machined in place in the machine for maximum precision. The collet itself is mounted on a pallet which can be clamped to/unclamped from an automatic clamping device typically fitted to the divider of a machining tool. The cone clamping principle of such a collet is described in the European patent document EP1602426B1.

However, as the segments must pivot in order to clamp the component, there is no fixed reference bearing point in space ensuring the height and location of the components. In other words, if a component is clamped with this type of collet, it is difficult to guarantee the precise axial and radial position thereof. If, for example, the component does not have exactly the same dimensions, or if the friction between the various segments and the clamping cone changes, the relative position of the component to the collet will change slightly. This problem is even greater for rework machining, which requires machining operations that are more localised compared to previous operations.

When a precision bearing point is required, this type of standard spring collet can generally no longer be used, as the space available in the centre of the clamp is reserved for the mechanical components transmitting the clamping/unclamping forces.

As a result, more customised solutions are generally required for these situations, which solutions are thus less flexible, have larger overall dimensions and are more expensive.

Another problem concerns the ability to hold, after a machining operation, a machined component that has been cut out of a blank component, which is the only piece that remains held in the collet.

It is again noted that, given the tendency towards miniaturising micromechanical machining tools, increasingly compact clamping means must be built, which means are able to guarantee all desired functions as well as the necessary stiffness and precision.

SUMMARY OF THE INVENTION

The purpose of the invention is to improve the positioning and clamping of a micromechanical or horological component or tool in a gripping device, by incorporating a precision reference bearing point therein. For this purpose, the invention relates to a gripping device for holding, centring and/or clamping a micromechanical or horological component.

The present invention can thus overcome this problem of providing a fixed reference bearing point in space, by offering at least one fixed reference bearing point, and in particular by modifying a standard, commercially-available collet of a recognised and widespread model, which makes the manufacture of a gripping device according to the invention very cost-effective. Moreover, such a modification does not alter the external dimensions of the collet.

Another aspect of the invention relates to a method for attaching such a micromechanical or horological component inside the clamping chamber comprised in such a gripping device.

BRIEF DESCRIPTION OF THE FIGURES

The purposes, advantages and features of the invention will be better understood upon reading the following detailed description given with reference to the accompanying drawings, in which.

DETAILED DESCRIPTION OF THE INVENTION

Figure 1:
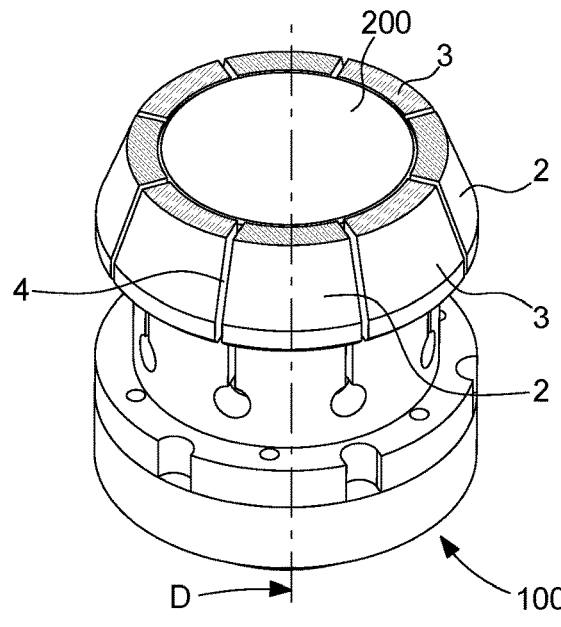
FIG. 1 diagrammatically shows a perspective view of a gripping device according to the invention, produced on the basis of a commercially-available spring collet comprising a plurality of jaws separated by slots; some of these jaws are machined internally so that they can no longer move when the spring collet is activated, and thus become stationary jaws, as opposed to the movable jaws, with which, in this non-limiting alternative embodiment, they are disposed alternately; this spring collet is of the type with substantially concentric clamping about a collet axis.
Figure 2:
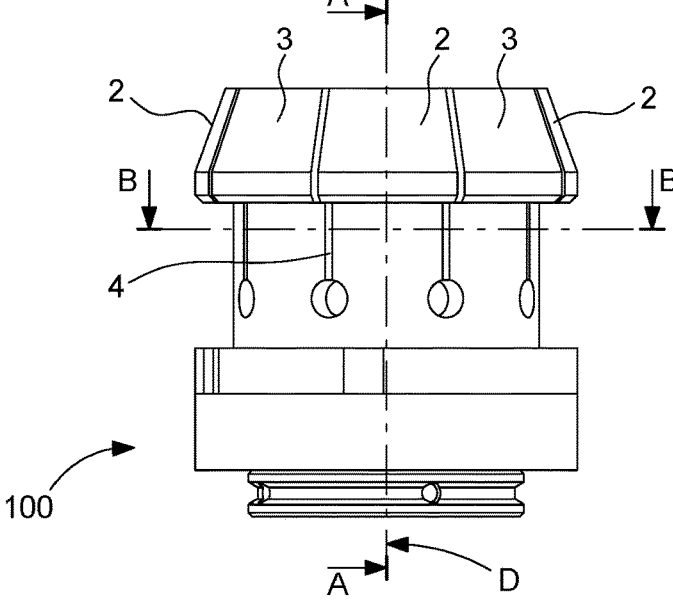
FIG. 2 diagrammatically shows a side view of the gripping device in FIG. 1.
Figure 3:
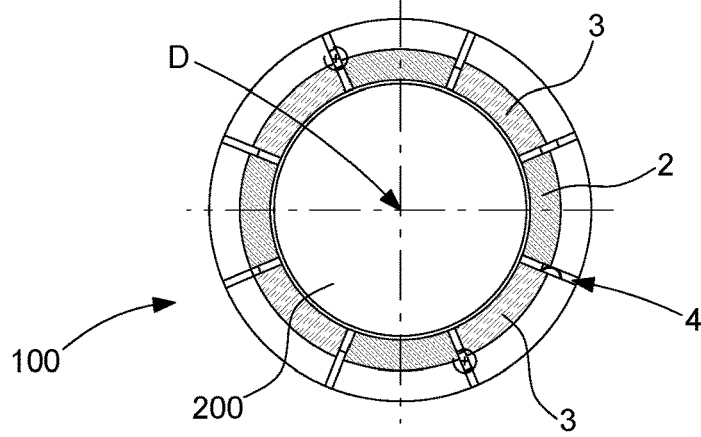
FIG. 3 diagrammatically shows a top view of the gripping device in FIG. 1.
Figure 4:
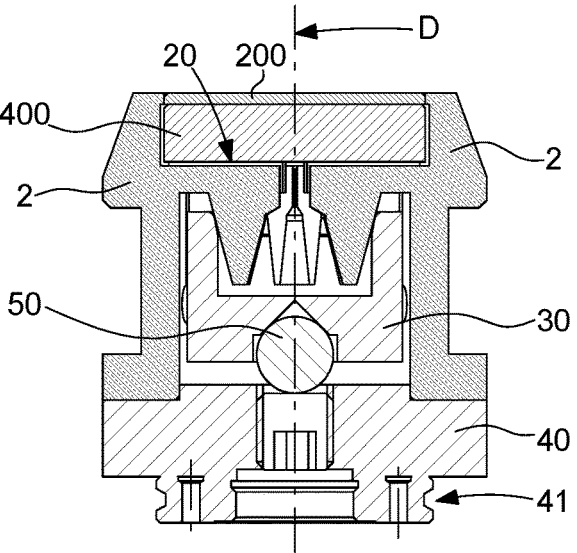
FIG. 4 diagrammatically shows a sectional view, along the cutting plane A-A in FIG. 2, of the gripping device in FIG. 1. The components are arranged in tiers along the collet axis, starting from the lower end of the gripping device. A pallet comprises a standardised handling interface, in this case in the form of a groove; the housing of a manoeuvring member (not shown), such as a screw or a rod, for pushing or pulling, passes therethrough; this pallet carries a pushing member, in this case a ball placed on a spring (not shown), which is actuated by the manoeuvring member to push a cone, which is in this case tapering inwards, which cooperates with conical sectors comprised in the movable jaws. These movable jaws comprise a clearance that surrounds a retaining plate holding the stationary jaws, which are not shown in this sectional view, which plate carries the component to be positioned and clamped, this clearance allowing the movable jaws to be manoeuvred by pivoting in order to clamp the component; it is thus understood that the movable jaws are actuated by the actuation cone thereof when the clamping screw is operated.
Figure 5:
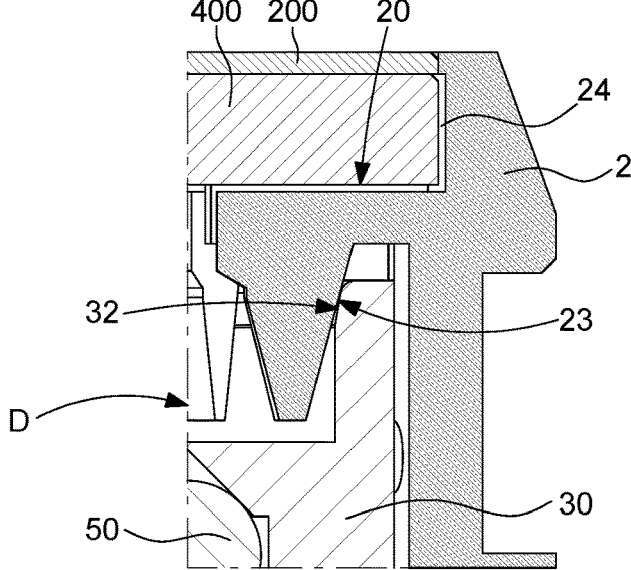
FIG. 5 shows a feature of FIG. 4 illustrating this clearance.
Figure 6:
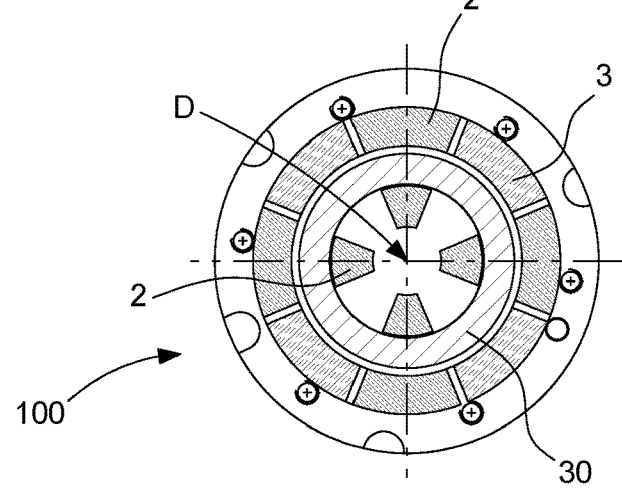
FIG. 6 diagrammatically shows a sectional view, along the cutting plane B-B in FIG. 2, of the gripping device in FIG. 1, illustrating the alternation of the stationary jaws with the movable jaws, of which only the conical sectors are visible in the central part, the stationary jaws having no actuating cones.
Figure 7:
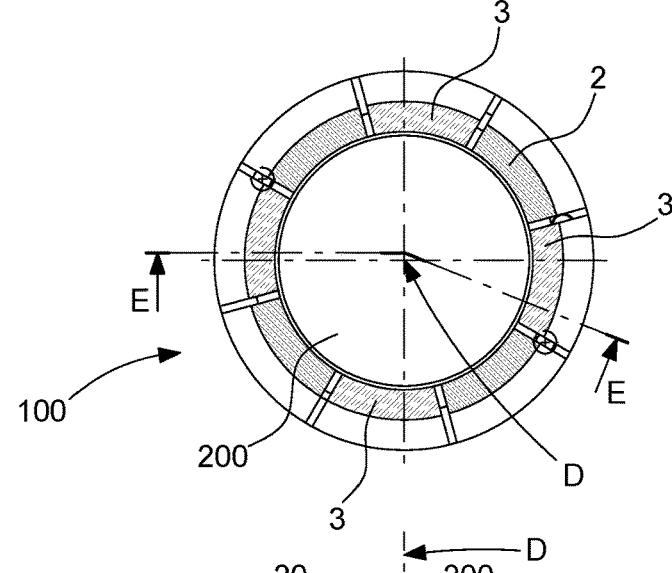
FIG. 7 shows, similarly to FIG. 3, the gripping device in FIG. 1 after the jaws have been pivoted.
Figure 8:
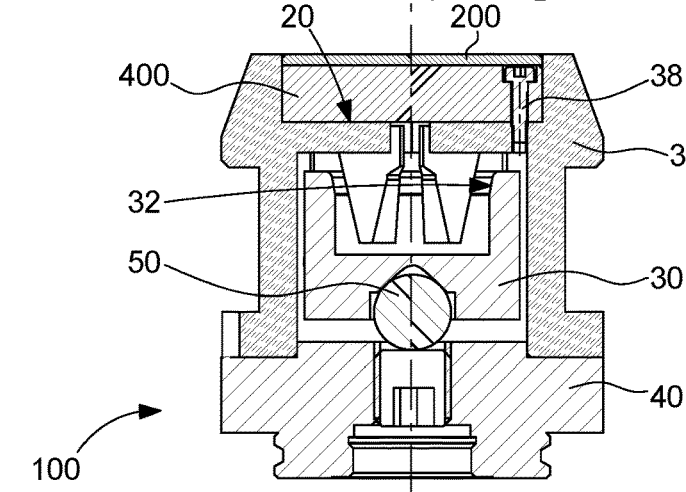
FIG. 8 shows, similarly to FIG. 4, the gripping device in FIG. 1 in a sectional view along the cutting plane E-E in FIG. 7, and shows the sole stationary jaws and the rigid connection thereof by way of a screwed retaining plate carrying the component.
Figure 9:
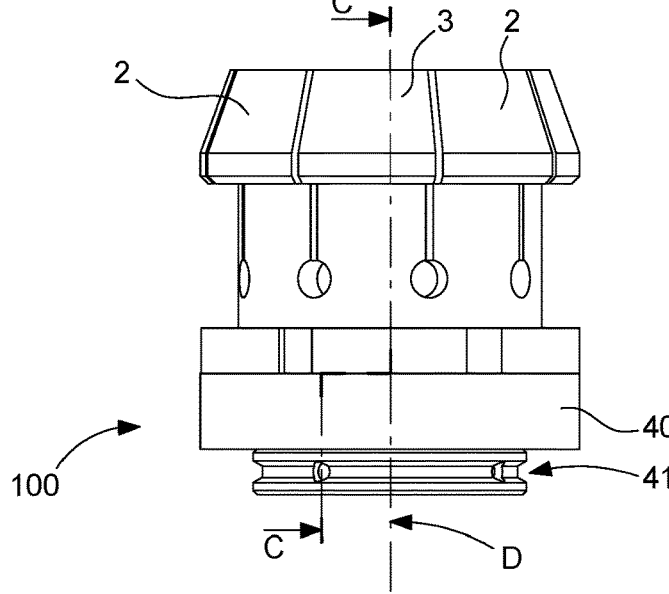
FIG. 9 shows, similarly to FIG. 2, the gripping device in FIG. 1 after the jaws have been pivoted.
Figure 10:
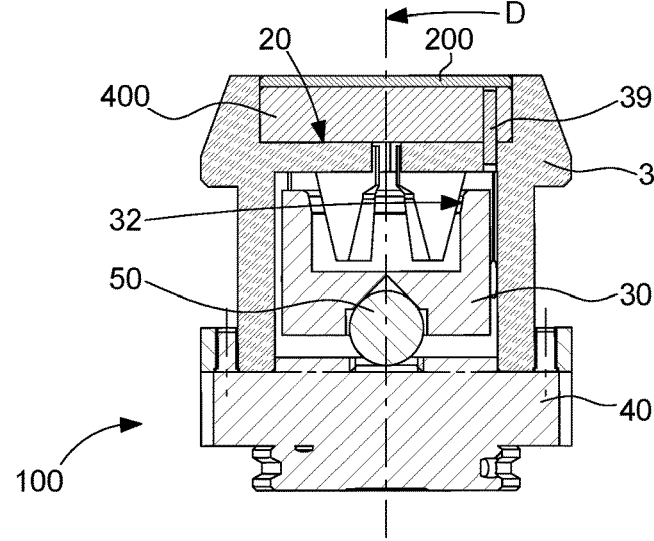
FIG. 10 shows, similarly to FIG. 8, the gripping device in FIG. 1 in a sectional view along the cutting plane C-C in FIG. 9, and shows the sole stationary jaws and the precise positioning thereof by pinning with the retaining plate carrying the component.

The invention relates to a gripping device 100 for holding, centring and/or clamping a micromechanical or horological component 200 in a clamping chamber delimited by a collet comprising at least one movable jaw 2.

More particularly, and in the non-limiting version illustrated by the figures, the invention relates to a gripper with a collet having substantially concentric jaws, distributed about a collet axis D; the principles of the invention which will be described hereinbelow are, however, applicable to other manufacturing tools, of the vice type, or to special tools with movable jaws.

In the non-limiting alternative embodiments illustrated in the figures, the invention is achieved by modifying commercially-available collets 80 (of the "Ottet" type or similar) in order to add a precision reference bearing point.

The reference bearing point allows the components to be clamped to be precisely positioned.

The example shown concerns the use of a standard collet as a clamping base, with the low-cost modification of standard collets 80 of the "Ottet" type or similar.

This modified collet is intended to be assembled on a pallet 40 fitted with a standard interface 41 available from suppliers such as "Erowa", "Yerly", "TG-Colin" or others, so as to be interchangeable and equip any type of machine with this clamping means. In an alternative embodiment, this device can also be attached directly to any shank nose.

The components can be clamped/unclamped either manually, using a screw or a ring, from outside the machine, or automatically, for example and in a non-limiting manner, using a control rod with which the machine is fitted.

Figures 11, 12:
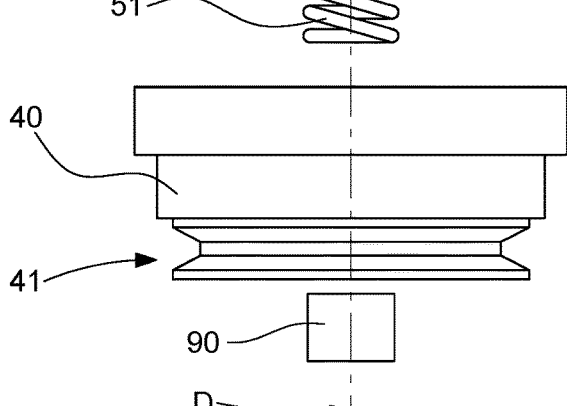
FIG. 11 diagrammatically shows an exploded, side view of the basic components of a spring collet that can be used to produce a gripping device according to one of FIGS. 1 to 10, with a cone tapering inwards.
FIG. 12 diagrammatically shows an exploded, side view of the basic components of a spring collet that can be used to produce a gripping device according to another embodiment, with a cone tapering outwards.

The gripping device 100 comprises a cone 30, which is an element that allows the collet to be closed or opened respectively, depending on the inwards/outwards tapering thereof, as shown in FIG. 11 (cone tapering inwards) and 12 (cone tapering outwards).

In order to modify the standard collet used, the invention will divide the role of the collet segments, in this case consisting of movable jaws 2 and stationary jaws 3, into two distinct functions. In particular and in a non-limiting manner, in order to be balanced, half of the segments can be shared for each function; any other combination is possible depending on the restrictions specific to the manufacturing operation to be carried out.

The first function remains the basic function of a gripper, i.e. of clamping/unclamping the component 200, while ensuring that it is centred.

The second function consists of eliminating the clamping/unclamping movement, and of rigidly connecting and stiffening the segments by means of a common plate in order to provide a fixed reference bearing point. To eliminate this movement on certain desired segments, the cones that actuate these particular segments must first be eliminated/machined.

The movable jaws 2 allow the component 200 to be clamped/unclamped (first function), and the stationary jaws 3 rigidly connected to one another form the reference bearing point (second function).

The movable jaws 2 are actuated by the cooperation between, on the one hand, the control cone 30 tapering inwards or outwards, driven by a clamping screw 90 passing through the pallet 40 and arranged to push the pushing means 50, in particular a ball or a push-piece shuttle, which is combined with an axial resilient return means 51 such as a spring, this cone 30 comprising conical surfaces 32, and, on the other hand, complementary evolving surfaces 23, in particular conical surfaces comprised in the movable jaws 2 incorporated into the collet 80. It goes without saying that the conical surfaces of the cone 30 and of the jaws can be replaced by other surfaces with an evolving profile.

Thus, according to the invention, this at least one movable jaw 2 or stationary jaw 3, or, when the collet comprises a plurality of jaws, at least some of the movable jaws 2 and/or stationary jaws 3, comprises a reference surface 20, which is arranged to support a component 200 directly bearing frontally thereagainst, or to support an intermediate retaining plate 400 directly bearing frontally thereagainst, arranged to bear frontally against this component 200. The gripping device 100 is arranged for clamping with the reference bearing point, and comprises stationary jaws 3 which comprise this reference surface 20, and which are arranged to support a component 200 bearing thereagainst, and movable jaws 2 which are arranged to centre and/or clamp a component 200 or an intermediate retaining plate 400.

Thus, the gripping device 100 comprises movable jaws 2 arranged for centring and/or clamping a component 200 and/or an intermediate retaining plate 400, which bears against the reference surface 20 and acts as a support for a component 200 bearing thereagainst, and these movable jaws 2 comprise a recess 24 which is made around this intermediate retaining plate 400 to provide a gap allowing these movable jaws 2 to deform resiliently and move towards the collet axis D, in order to clamp the component 200.

More particularly, the gripping device 100 comprises stationary jaws 3 comprising the reference surface 20 and arranged to support a component 200 bearing thereagainst, and such movable jaws 2 arranged to centre and/or clamp a component 200 and/or an intermediate retaining plate 400, which bears against the reference surface 20 and acts as a support for a component 200 bearing thereagainst, and is arranged to hold the stationary jaws 3.

More particularly, the gripping device 100 comprises, aligned along a collet axis D, a pallet 40 comprising gripping means 41 arranged to cooperate with a tool and/or a handling device, and an actuating device arranged to control the opening or closing of the collet.

In one particular embodiment, this actuating device comprises a ring that rotates about the collet axis D to control closing of the collet by pushing on the movable jaws 2 comprised in the collet.

In another particular embodiment illustrated by the figures, the gripping device 100 comprises, along the collet axis D, through or around this pallet 40, a manoeuvring means 90, such as a screw, a nut, or a push or pull rod, for actuating pushing means 50 on a resilient support, and a cone 30 tapering inwards or outwards, comprising evolving surfaces 32, in particular conical surfaces, which are arranged to cooperate with complementary surfaces 23 comprised in the movable jaws 2 and/or the stationary jaws 3, and which constitute surfaces for actuating the collet 80.

More particularly, only the movable jaws 2 comprise such complementary surfaces 23, which the stationary jaws 3 do not have.

More particularly, the movable jaws 2 on the one hand, and the stationary jaws 3 on the other, are rotationally symmetrical relative to the collet axis D.

More particularly, there is an equal number of movable jaws 2 and stationary jaws 3.

The drawing shows a screw being used as a manual means for clamping/unclamping the collet. However, if the machine is equipped with a control rod that passes through the centre of the pallet, then the control rod can replace the screw to act as an automatic clamping/unclamping means if it is powerful enough.

It goes without saying that positional indexing, and in particular indexing the angular position of the component 200, can be achieved by any means, the simplest and least expensive being the pin; this pin can be on the stationary jaws 3, or on the retaining plate holding the stationary jaws 3. The figures illustrate the case where the pin 39 is attached inside the retaining plate, as the latter is itself pinned in a spring collet. In an alternative embodiment, if we are working with a standardised blank that has a reference such as a notch, for example, it may be advantageous to have an orientation in the stationary jaws; the retaining plate, which has a different indentation for each reference, can thus be changed without having to add a pin or without having to machine a drop in the indentation. If the workpiece has a milled indexing face or a dihedral angle, the pin in the retaining plate, or an orienting counter-form machined directly into the retaining plate, can take over the indexing. It is understood that using a variety of intermediate retaining plates adapted to the manufacture of each type of component is less expensive than machining jaws, which is sometimes irreversible.

In short, the invention allows for the cost-effective manufacture of a gripping device that guarantees both correct positioning of the component and correct clamping; in particular, it can be produced by modifying a recognised and widespread standard clamping means, such as an "Ottet" type collet or the like.

The invention improves machining accuracy, in particular for rework machining, because the reference bearing point allows for better positional repeatability.

The invention is easy to identify, thanks to the distinction between stationary and movable segments (with the absence of actuating cones and the rigid connection of the stationary segments by means of a retaining plate), and the presence of a reference bearing point on the stationary segments.

The compactness of the invention complies perfectly with the tendency towards miniaturising micromechanical machining means, with overall dimensions that precisely meet the dimensional requirements of today's micromachines, while incorporating additional functions.

The invention claimed is:

1. A gripping device for holding, centring and/or collet-clamping a micromechanical or horological component in a clamping chamber delimited by a collet of the gripping device, wherein the collet comprises, distributed about a collet axis:
   a plurality of movable jaws and a plurality of stationary jaws,
   wherein at least some of said stationary jaws, each comprise a respective reference surface arranged to support either of:
   (i) a said component directly bearing frontally thereagainst, or
   (ii) an intermediate retaining plate directly bearing frontally thereagainst, against which intermediate retaining plate a-said component frontally bears, and
   wherein said movable jaws are arranged to centre and/or clamp said component and/or are arranged to centre and or clamp said intermediate retaining plate.

2. The gripping device according to claim 1, wherein said movable jaws each comprise a respective recess configured to provide a gap allowing said movable jaws to deform and move towards said collet axis (D), in order to clamp said component.

3. The gripping device according to claim 1, wherein said reference surfaces are arranged to support said intermediate retaining plate, which bears against said reference surfaces and acts as a support for a said component bearing thereagainst.

4. The gripping device according to claim 1, wherein said gripping device comprises, aligned along the collet axis (D), a pallet comprising gripping means arranged to cooperate with a tool and/or arranged to cooperate with a handling device, and wherein the gripping device comprises an actuating device arranged to control opening or closing of said movable jaws of said collet.

5. The gripping device according to claim 4, wherein said actuating device comprises a ring capable of rotating about said collet axis (D) to control the closing of said movable jaws of collet, by pushing on said movable jaws.

6. The gripping device according to claim 4, wherein said actuating device comprises pushing means on a resilient support, a cone tapering inwards or outwards, the cone comprising conical surfaces arranged to cooperate with complementary surfaces, and which conical surfaces constitute surfaces for actuating said collet.

7. The gripping device according to claim 6, wherein only said movable jaws comprise said complementary surfaces, which said stationary jaws do not have.

8. The gripping device according to claim 1, wherein said movable jaws and said stationary jaws are alternating.

9. The gripping device according to claim 8, wherein said movable jaws on the one hand, and said stationary jaws on the other, are rotationally symmetrical relative to said collet axis (D).

10. The gripping device according to claim 8, wherein there is an equal number of said movable jaws and said stationary jaws.

* * * * *